(12) United States Patent
Parida

(10) Patent No.: US 9,753,675 B2
(45) Date of Patent: Sep. 5, 2017

(54) PROVIDING PROMOTIONAL CONTENT FOR PRINTERS

(75) Inventor: Anshuman Parida, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 692 days.

(21) Appl. No.: 13/494,586

(22) Filed: Jun. 12, 2012

(65) Prior Publication Data
US 2013/0329246 A1    Dec. 12, 2013

(51) Int. Cl.
*G06Q 30/02*    (2012.01)
*G06F 3/12*    (2006.01)

(52) U.S. Cl.
CPC .......... *G06F 3/1203* (2013.01); *G06F 3/1242* (2013.01); *G06F 3/1288* (2013.01); *G06Q 30/02* (2013.01); *G06F 3/1272* (2013.01)

(58) Field of Classification Search
CPC ................................. G06K 15/02; H04N 1/46
USPC .................. 358/1.1–1.9, 1.11–1.18
See application file for complete search history.

(56) References Cited

U.S. PATENT DOCUMENTS

| | | | |
|---|---|---|---|
| 6,230,143 B1 * | 5/2001 | Simons ................. | G06Q 30/02 705/14.25 |
| 6,891,635 B2 * | 5/2005 | Dutta .................... | G06Q 30/02 358/1.15 |
| 7,921,037 B2 | 4/2011 | Hertling et al. | |
| 8,780,395 B1 * | 7/2014 | Juda ........................ | H04N 1/46 358/1.1 |
| 2003/0149573 A1 * | 8/2003 | Lynton .............. | 705/1 |
| 2004/0196491 A1 * | 10/2004 | Uchino ........................ | 358/1.15 |
| 2006/0229940 A1 | 10/2006 | Grossman | |
| 2008/0096486 A1 * | 4/2008 | Whitten ........................ | 455/66.1 |
| 2008/0097837 A1 * | 4/2008 | Jacobson ........................ | 705/14 |
| 2008/0270358 A1 | 10/2008 | Chatow et al. | |
| 2009/0254802 A1 | 10/2009 | Campagna et al. | |
| 2009/0292600 A1 * | 11/2009 | Davis ..................... | G06Q 20/20 705/14.14 |
| 2009/0307079 A1 | 12/2009 | Martin, Jr. | |
| 2010/0067039 A1 | 3/2010 | Williams | |
| 2010/0153008 A1 | 6/2010 | Schwartz et al. | |
| 2010/0220350 A1 * | 9/2010 | Faridi .................... | H04L 41/026 358/1.15 |
| 2011/0235088 A1 * | 9/2011 | Luo .............................. | 358/1.15 |

* cited by examiner

*Primary Examiner* — Ibrahim Siddo

(74) *Attorney, Agent, or Firm* — Mahamedi IP Law LLP

(57) ABSTRACT

A method is disclosed for providing promotional content to be printed on a media. The method is performed by a server in a network. A printer is registered and one or more promotional settings are configured for the registered printer. A print request is received from a client device. In response to the receiving the print request, one or more promotional content items are retrieved based on the print request and the one or more promotional settings for the registered printer.

18 Claims, 3 Drawing Sheets

PROVIDING PROMOTIONAL CONTENT FOR PRINTERS

BACKGROUND OF THE INVENTION

Advertisements can be found in a variety of different mediums, such as on billboards, in television programming or on printed materials. By providing advertisements in a wide range of mediums, the chances that people see an advertisement and buy a product, for example, in response to the advertisement can be increased.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
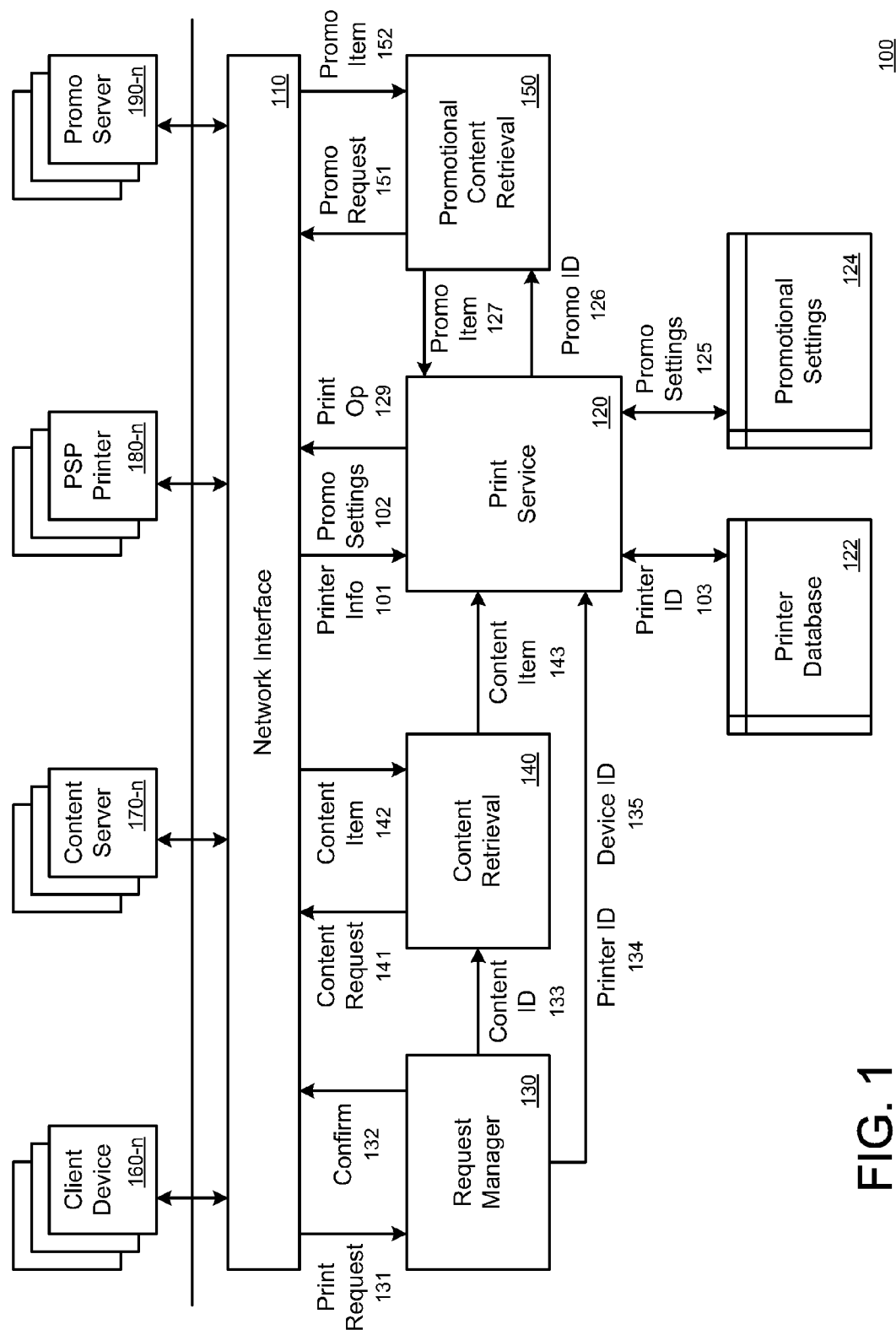
FIG. 1 illustrates an example system for providing promotional content to be printed, under an embodiment.

Embodiments described herein provide for a system that enables promotional content to be printed for an end user based on promotional content settings that are configured by an owner/user of a network-enabled printer (e.g., a print service provider).

According to embodiments, a print service provider can register a printer with a network-enabled server (e.g., a server that provides cloud printing services) so that local or remote devices can request content to be printed by the registered printer. One or more promotional settings can be configured and stored by the server for the registered printer. As described herein, the server can receive a print request from a client device (e.g., device of an end user) and in response to receiving the print request, one or more promotional content items can be retrieved based on the print request and the one or more promotional settings.

In one embodiment, the print request can identify the client device that made the request, one or more content items (e.g., a document, an email, a website) requested to be printed on a media sheet (e.g., a sheet of paper, a note card, an envelope), and the registered printer in which to print the one or more content items. Based on the print request and the promotional settings that have been configured for the registered printer, the server can retrieve a particular promotional content item for the requesting client device and cause the registered printer to print the promotional content item with the one or more content items that have been requested to be printed.

As described herein, promotional content items can include an advertisement, a coupon, a validation code, or a barcode (e.g., a QR code) or link to other promotional content items. In some embodiments, a print service provider can upload a plurality of promotional content items to a promotional content server in the network. The promotional content server can be, for example, a cloud storage device or a third party server that can communicate with the network-enabled server over the network.

In other embodiments, the server can enable a print service provider to configure the one or more promotional content settings for a particular printer via a user interface feature. Depending on implementation variations, a user interface feature can be provided to the registered printer (e.g., the user interface feature can be provided on a touch-sensitive display screen or panel of the registered printer) and/or to a computing device that is coupled to the registered printer. The printer service provider can access the user interface feature to configure the promotional content settings for his or her registered printer.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system for providing promotional content to be printed for an end user, under an embodiment. More specifically, FIG. 1 illustrates a system for that enables a print service provider to configure one or more promotional content settings for a registered printer. In this manner, when an end user requests to print a content item using the registered printer, one or more promotional content items can be retrieved and printed based on the promotional content settings that have been configured by the print service provider. A system such as described can be implemented in various contexts.

In an embodiment, system 100 includes a network interface 110, a print service 120, a request manager 130, a content retrieval 140, and a promotional content retrieval 150. In operation, the components of system 100 may be implemented on network side resources (e.g., a server or combination thereof). System 100 can communicate over a network, via the network interface 110 (e.g., wirelessly or using a wireline), to communicate with one or more client devices 160, one or more content servers 170, one or more print service provider (PSP) printers 180, and one more promotional (promo) servers 190.

In one implementation, system 100 is provided as a service, operable to communicate with print service providers as well as client terminals (e.g., mobile computing devices, personal computers, tablet devices) in order to provides cloud printing services. Accordingly, system 100 can be implemented by one or more servers, or through other computer systems in alternative architectures (e.g., peer-to-peer networks, etc.). In alternative implementations, some or all of the components of system 100 can be implemented on client machines, such as through applications that operate on user terminals. For example, a client application may execute to perform the processes described by the various components of system 100.

According to some embodiments, a print service provider can register one or more PSP printers 180 with the print service 120 so that an end user can operate her device (a client device 160) to print various content items to the registered PSP printer 180. A print service provider, for example, can be an individual or an entity, such as a print shop, a coffee shop owner, a bookstore, a hotel, an airport, etc., who allows for end users to print to their PSP printer 180 (e.g., for free or for a fee). When a print service provider registers one or more PSP printers 180 with the print service 120, the client devices 160-n that are also registered with the print service (e.g., have access to the print service 120) can request to print to any one of the registered PSP printers 180.

In some embodiments, when a PSP printer 180 is registered with the print service 120, printer information 101 is provided to the print service. The printer information 101 can include an address for the PSP printer 180 (e.g., an IP address, or a registered printer email address), the geographic location of the PSP printer 180 (e.g., street address where the printer is located, store information, city, zip code), costs to print to the PSP printer 180, type of printer the PSP printer 180 is (e.g., color printer, laser printer, ink-jet printer), or other information about the PSP printer 180. The printer information 101 of each PSP printer 180 that is registered with the print service 120 can be stored in a printer database 122 with a printer ID 103 of each PSP printer 180.

For each registered PSP printer 180, the print service provider can configure one or more promotional settings 102 for that printer. According to embodiments, the promotional settings 102 can be provided to the print service 120 after a PSP printer 180 is registered or during the registration process itself. The promotional settings 102 for each of the registered PSP printers 180 can be stored in the promotional settings database 124. The promotional settings 102 can be used to defined conditions that enable promotional content to be printed for an end user (e.g., print a coupon for free), when such conditions are satisfied by a print request from a particular end user.

In some embodiments, the promotional settings 102 include a promotional content identifier, a promotional content validation, a customer type, and print page counts. Other promotional settings 102 can include the type of content being requested to be printed, when the print operation is requested, the location of the end user who is requesting the print (e.g., is the user in a certain geography of the PSP printer), the type of print request (color vs. black and white, or photo printing), etc. The print service provider can select and configure different combinations of promotional settings 102 for each PSP printer 180.

A promotional content identifier can be used to identify one or more particular promotional content items that are to be printed by the PSP printer 180. For example, a print service provider can upload a plurality of different promotional content items (e.g., ten different promotional content items) to a promo server 190. Each of the promotional content items can have a corresponding identifier. The print service provider can configure the promotional settings 102 for a first PSP printer 180-1, for example, to print a particular advertisement that corresponds to a particular promotional content identifier (e.g., print advertisement #3). In other embodiments, the print service provider can configure the promotional settings 102 so that in different situations, different promotional content items are printed.

In other embodiments, the print service provider can configure a promotional content validation so that a particular promotional content item is only printed for a certain duration of time (e.g., during a time period a coupon is only valid for, or a time period for a limited offer advertisement). The promotional content validation can also be configured so that after a validation period ends for a first promotional content item, a different promotional content item can be selected and configured from the list of promotional content items.

Other promotional settings 102 that can be configured by the print service provider includes a customer type. For different levels or types of customers, different promotional content items can be printed. For example, the print service provider can select promotional content item #2 to be printed for users who are classified as being a general end user, whereas promotional content item #4 is configured to be printed for users who are classified as being a special or executive end user. In some embodiments, the different types can be a tiered structure (e.g., silver, gold, platinum members, etc.).

The end user classifications can be configured by the print service provider as well. When an end user requests a print operation using a client device 160, the client device 160 can notify the print service 120 of its customer type/level. For example, a user who is classified as being a high-tiered member can receive free or reduced printing costs, and at the same time, receive a particular promotional content item, as opposed to a user who is classified differently.

In another embodiment, the promotional settings 102 can also include a page count. For example, the print service provider can configure the page count for the PSP printer 180 so that an end user who prints a certain number of pages (at least N pages) can receive a particular promotional content item and/or reduced printing costs.

The print service provider can configure the one or more promotional settings 102 by interacting with a user interface feature. According to one or more embodiments, the print service 120 can provide a user interface feature for configuring the promotional settings 102 to a display screen or panel of the registered printer and/or to a computing device that is coupled to the registered printer (e.g., a personal computer of the print service provider). The printer service provider can access the user interface feature to configure the promotional content settings for his or her registered printer.

In one embodiment, the promotional settings 102 can be reconfigured by the print service provider at any time. For example, if new promotional content items are received and uploaded by the print service provider, the PSP printer 180 can be reconfigured to have different promotional settings 102. The print service provider can also choose to configure the one or more promotional settings 102 so that no promotional content items are printed for an end user. After the promotional settings 102 are configured by the print service provider and provided to the print service 120, the print service 120 can store the particular promotional settings 125 for each of the registered PSP printers 180 in the promotional settings database 124 (e.g., by using the printer ID 103).

In some embodiments, an end user who is requesting to print to a particular PSP printer 180 can request that no promotional content be printed for that user during the print operation (e.g., select an option on a print menu that causes a Do-Not-Disturb message to be sent to system 100). For example, the request manager 130 can receive such a message and notify the print service 120. The print service 120 will not look up the promotional settings 124 for the requested PSP printer 180.

As described herein, promotional content items can include an advertisement, a coupon, a validation code, or a barcode (e.g., a QR code) or link to other promotional content items. These promotional content items can be stored in one or more promo servers 190. A promo server 190 can be a cloud storage device or a third party server that can communicate with the print service 120 over the network. In some embodiments, the promo server 190 can also be a content server 170 (or vice versa).

When a promotional content item is provided by an advertiser, a marketer, or any individual who wants to promote or market a product, a job posting, a service, etc., the print service provider can upload the promotional content items to the promo server 190. In some cases, the print service provider can upload his or her own promotional content (e.g., if the print service provider is a coffee shop, a promotional content item that is uploaded can be a coupon for a free coffee). The promotional content item can be provided to the print service provider as a hard copy (e.g., a printed advertisement or coupon) so that the print service provider can scan/take an image of the promotional content item and upload it to a promo server 190. The promotional content item can also be provided as a soft copy (e.g., a file of a graphic image or coupon or code that is transmitted to the print service provider's email, personal computer, or PSP printer). When the print service provider uploads and stores the promotional content items to the promo server 190, each promotional content item can have a promotional content identifier. In this way, the print service 120 can communicate with the promotional content retrieval 150 at a later time to retrieve the proper promotional content item from the promo server 190.

Print Operation Example

Once the print service provider(s) registers the PSP printer(s) 180 with the print service 120 and configures the promotional settings 102 for each of the registered PSP printer(s), a promotional content item can be printed for an end user. An end user can operate a client device 160 in order to print a content item. In some embodiments, the client device 160 is a device that is already registered with the print service 120. The user can access the client device 160 to select a particular registered PSP printer 180 to print to (e.g., an end user can select a printer at a location closest to the end user).

The client device 160 can provide a print request 131 to system 100. The print request 131 can identify the client device 160, the content item to be printed (e.g., an email or a document or a photograph), and the registered printer that is to print the content item. The request manager 130 can identify the various information from the print request 131. In one embodiment, the request manager 130 can provide a confirmation 132 to the client device 160 that the print request 131 has been received. In other embodiments, the confirmation 132 can include a notification that provides an authorization code that the end user must input at the selected PSP printer 180 (e.g., so that the content item will not be printed until the end user provides the authorization code). In this manner, unwanted documents will be prevented from being printed, strangers will not be able to take printed documents that do not belong to them, and/or the print service provider can have the end user pay first before printing.

From the print request 131, the request manager 130 determines the content that is being requested to be printed and provides a content identifier 133 to the content retrieval 140. The request manager 130 also provides a printer identifier 134 and a device identifier 135 that identifies the client device 160 that requested the print operation to the print service 120.

According to an embodiment, the content retrieval 140 can determine the source of the content item based on the content identifier 133. The source of the content item can be one or more content servers 170 (e.g., a third party service provider server), such as an email service provider (YAHOO mail or GOOGLE mail), a social networking service provider, or a cloud storage or document provider. A source of the content item can also be from the client device (e.g., a photo or document stored in a memory resource of the client device). The content retrieval 140 provides a content request 141 to the respective content source to retrieve the content item 142 for printing. The content item 143, including information corresponding to the content item 143 (or information for retrieving the appropriate content item), can be provided to the print service 120.

The print service 120 can use the printer identifier 134 to retrieve or receive printer information from the printer database 122. Based on the printer information, the print service 120 can determine which PSP printer 180 has been requested to print the content item for the end user. The print service 120 can also determine the promotional settings 125 for that particular PSP printer 180 from the promotional settings database 124.

Based on the device identifier 135 (which identifies the client device 160 and the end user (e.g., the owner of the client device 160)) and the promotional settings 125 for the PSP printer 180, the print service 120 can provide a particular promotional content identifier 126 to the promotional content retrieval 150. The promotional content retrieval 150 can use the promotional content identifier 126 to provide a promotional content request 151 to a promo server 190 that stores one or more promotional content items. The promo server 190 can provide the corresponding promotional content item 152 to the promotional content retrieval 150.

In some embodiments, the print service 120 can format or modify the promotional content item 152 for printing for the end user. For example, depending on the content the end user is requesting to print, the promotional content item 152 can be modified in size or color (e.g., to be change a color advertisement to be black and white in color).

The print service 120 can request a print operation 129 with the retrieved information to the proper PSP printer 180 so that the content item requested by the end user and the retrieved promotional content item can be printed by the requested PSP printer 180 (e.g., concurrently or individually). For example, the print operation 129 can identify the PSP printer 180 that is to print the content for the end user, the content item 143 that is to be printed, and the promotional content item 127 that has been selected to be printed. In this manner, the content item requested to be printed can be printed along with the promotional content item based on the configured promotional settings.

In some embodiments, some of the components that are described in system 100 can be provided as being individual components or as being part of the same component. For example, the print service 120 and the promotional content retrieval 150 can be provided as part of the same component. In another example, the print service 120 and the content retrieval 140 can be provided as part of the same component. In another embodiment, the components that are described in system 100 can be provided as part of the device operating system or as part of one of more applications or services. Logic can be implemented with various applications (e.g., software) and/or with hardware of a computer system that implements system 100.

Methodology

Figure 2:
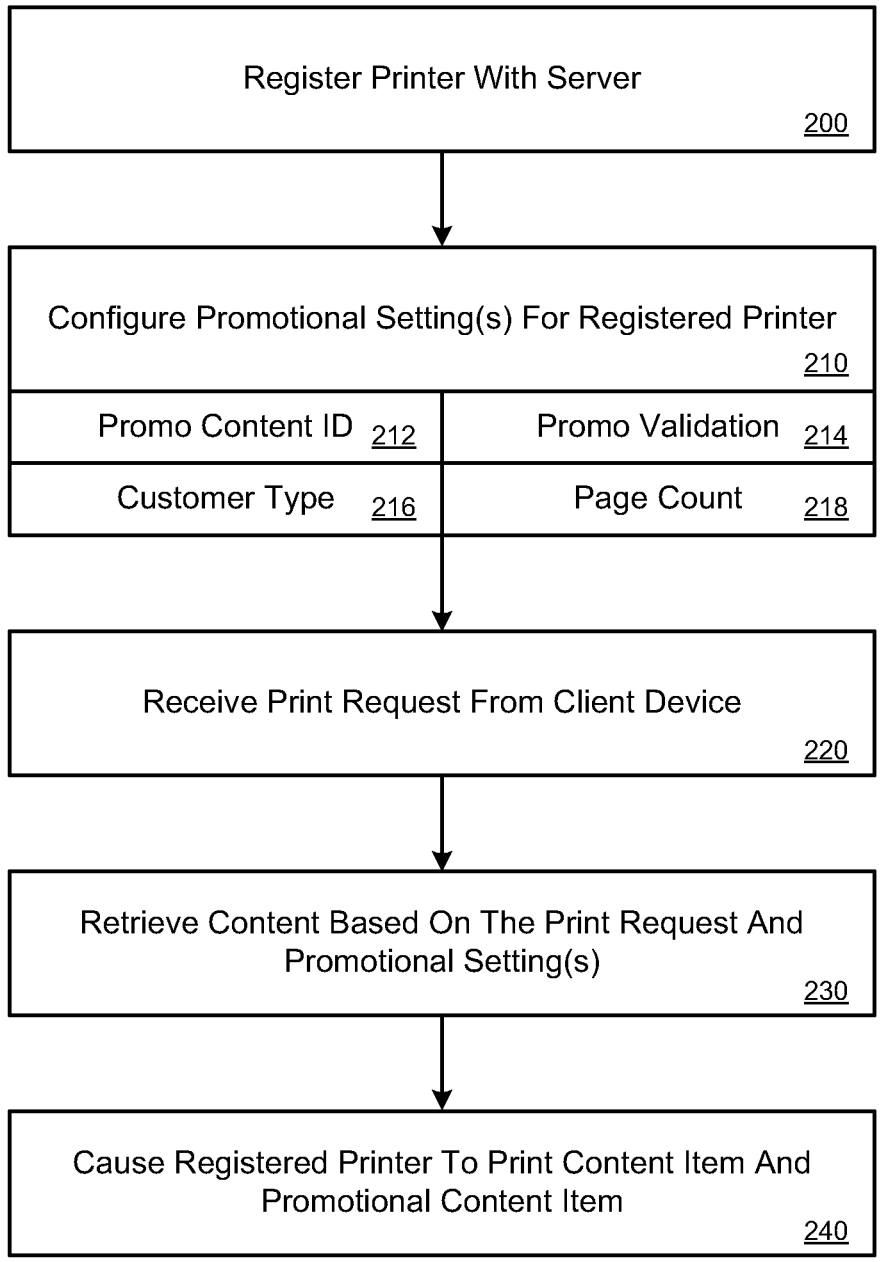
FIG. 2 illustrates an example method for providing promotional content to be printed, according to an embodiment.

FIG. 2 illustrates an example method for providing promotional content to be printed for an end user, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described. FIG. 2 illustrates an example method for rendering audio on a computing device, according to an embodiment.

According to an embodiment, one or more PSP printers are registered with the network-enabled server (step 200). The network-enabled server can be a part of a network that enables a cloud printing service to a plurality of end users. A print service provider can register one or more PSP printers with the server by providing information about each of the PSP printers to the server (e.g., an address, a geographic location, printer type information). Once the PSP printer is registered, an end user is able to request a content item to be printed at a registered PSP printer from his or her client device.

The promotional settings for each registered printer can be configured and stored in a memory of the server (step 210). In some embodiments, a print service provider can configure one or more promotional settings for each of their PSP printers after, before, or during the printer registration. The print service provider can access a settings menu, for example, from a user interface feature provided on the PSP printer itself (e.g., provided on a display panel on the PSP printer) or provided with a connected computer in order to select and input various promotional settings for the PSP printer. These settings can be transmitted to the network-enabled server and stored in a database for each PSP printer.

The promotional settings can define various conditions that enable a promotional content item to be printed for an end user when the end user requests to print a content item to a PSP printer. According to embodiments, a print service provider can configure a promotional content identifier (sub-step 212) that identifies a particular promotional content item to be retrieved and printed. The print service provider can also configure a promotional content validation setting (sub-step 214), which can include settings for providing a particular promotional content item during a certain period of time or for providing a promotional content item when the end user inputs or provides some validation code or performs a task.

The print service provider can configure a customer type or classification setting (sub-step 216) so that different promotional content items can be retrieved for different level customers (e.g., end user). The customer type can be configured by the print service provider so that promotional content items can be printed for free for certain users (e.g., a user that is currently staying at the hotel owned or operated by the print service provider). In other embodiments, the print service provider can configure a page count setting (sub-step 218) so that promotional content items can be printed for certain end users who are paying for printing a particular number of pages. The promotional settings and an identifier for each PSP printer can be stored in the network-enabled server (or in other storage devices or servers that can communicate with the network-enabled server).

A print request for a content item can be received from a client device (step 220). The print request can identify the client device (and in turn, identify the end user of the client device), the content item that is to be printed (e.g., a website, an email, a document, or a photograph, etc.), and the registered PSP printer that is to print the content item. Based on the print request, the network-enabled server can process the various information in order to retrieve the content item to be printed (or cause the content item to be sent from the content source, e.g., a content server, to the registered printer).

The network-enabled server can also retrieve one or more promotional content items from a promotional content store or server based on the print request and the promotional settings that have been configured for the registered PSP printer that is to print the content item (step 230). Based on the present conditions (e.g., the client device identifier, the number of pages that the end user wants to print) and the configured promotional settings, the network-enabled server can select a promotional content (e.g., using a promotional content identifier) that is to be printed for the end user.

The retrieved promotional content item and the content item that is to be printed, can be printed for the end user at the selected PSP printer (step 240). In one embodiment, the network-enabled server can send a print operation request to the selected PSP printer with information describing what it is the PSP printer is to print. This information can include data corresponding to the content item that the end user requested to print (or data for retrieving the content item from the content source) and data corresponding to the retrieved promotional content item(s).

Hardware Diagram

Figure 3:
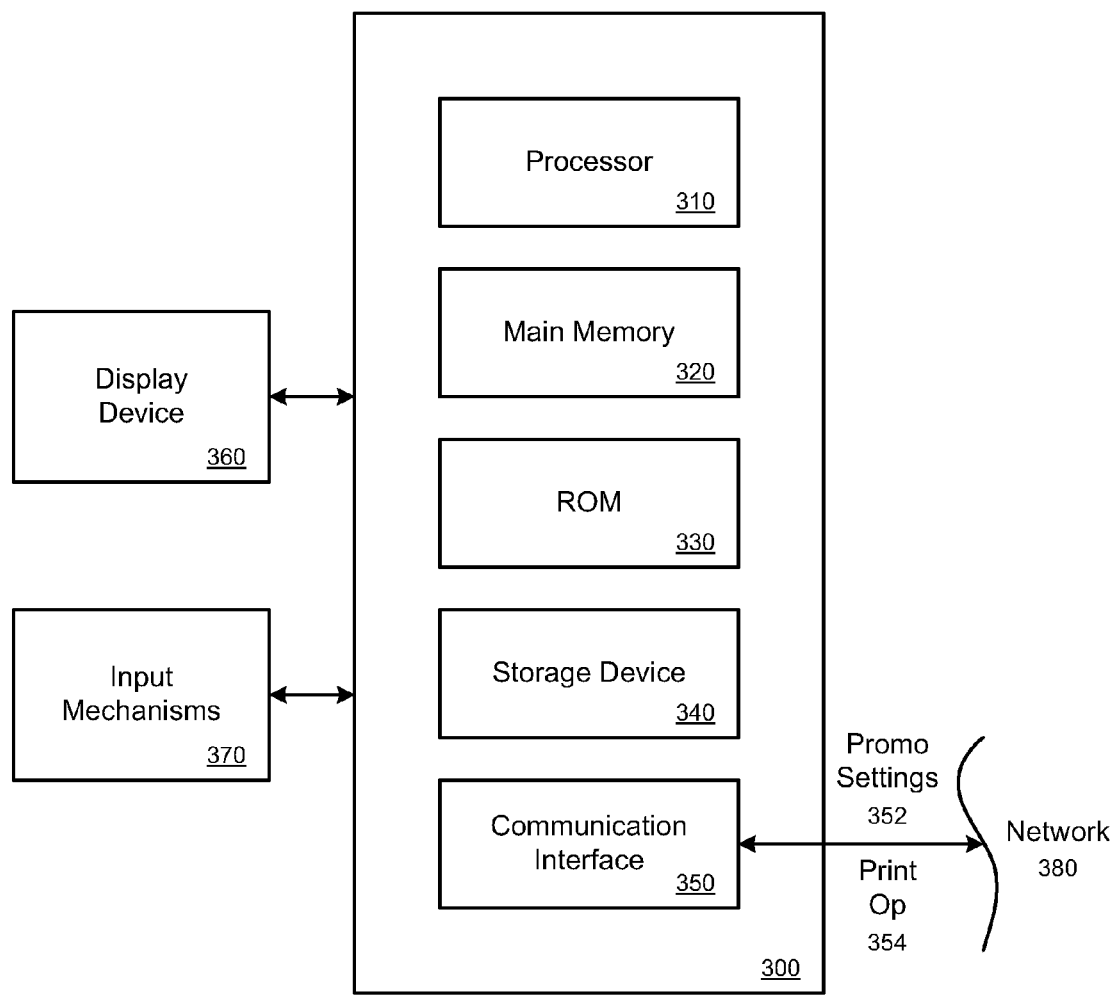
FIG. 3 is a block diagram that illustrates a computer system upon which embodiments described herein may be implemented.

FIG. 3 is a block diagram that illustrates a computer system upon which embodiments described herein may be implemented. For example, in the context of FIG. 1, system 100 may be implemented using a computer system such as described by FIG. 3.

In an embodiment, computer system 300 includes processor 310, main memory 320, ROM 330, storage device 340, and communication interface 350. Computer system 300 includes at least one processor 310 for processing information. Computer system 300 also includes a main memory 320, such as a random access memory (RAM) or other dynamic storage device, for storing information and instructions to be executed by the processor 310. Main memory 320 also may be used for storing temporary variables or other intermediate information during execution of instructions to be executed by processor 310. Computer system 300 may also include a read only memory (ROM) 330 or other static storage device for storing static information and instructions for processor 310. A storage device 340, such as a magnetic disk or optical disk, is provided for storing information and instructions.

The communication interface 350 may enable the computer system 300 to communicate with one or more networks 380 through use of the network link (wireless or wireline). Using the network link, the computer system 300 can communicate with one or more client devices, one or more content servers, one or more promotional content servers, and one or more print service provider printers. In some embodiments, the computer system 300 can receive configured promotional settings 352 from a print service provider for a registered PSP printer via the network link. Such promotional settings 352 can be stored in, for example, the storage device 340. Using the network link, the print operation 354 can be communicated to a registered printer in order to print a promotional content item for an end user.

Computer system 300 can include a display device 360, such as a cathode ray tube (CRT), a LCD monitor, or a television set, for example, for displaying graphics and information to a user. An input mechanism 370, such as a keyboard that includes alphanumeric keys and other keys, can be coupled to computer system 300 for communicating information and command selections to processor 310. Other non-limiting, illustrative examples of input mechanisms 370 include a mouse, a trackball, touch-sensitive screen, or cursor direction keys for communicating direction information and command selections to processor 310 and for controlling cursor movement on display 360. While only one input mechanism 370 is depicted in FIG. 3, embodiments may include any number of input mechanisms 370 coupled to computer system 300.

Embodiments described herein are related to the use of computer system 300 for implementing the techniques described herein. According to one embodiment, those techniques are performed by computer system 300 in response to processor 310 executing one or more sequences of one or more instructions contained in main memory 320. Such instructions may be read into main memory 320 from another machine-readable medium, such as storage device 340. Execution of the sequences of instructions contained in main memory 320 causes processor 310 to perform the process steps described herein. In alternative embodiments, hard-wired circuitry may be used in place of or in combination with software instructions to implement embodiments described herein. Thus, embodiments described are not limited to any specific combination of hardware circuitry and software.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for providing promotional content to be printed in connection with a cloud print service, the method being performed by one or more servers and comprising:
   registering a printer with the cloud print service, the registered printer being operated by a print service provider;
   receiving, from the registered printer over one or more networks, data indicating one or more promotional settings for the registered printer, wherein the print service provider configures the one or more promotional settings on a user interface generated on a display screen of the registered printer, and wherein the one or more promotional settings are usable by the cloud print service to define conditions that enable promotional content items that advertise or market a product or service to be printed with the print content when the conditions are satisfied by a print request;
   receiving, over the one or more networks, a print request from a client device of a user of the cloud print service, the print request identifying (i) the client device, (ii) print content to be printed, and (iii) the registered printer; and
   based on the print request and the one or more promotional settings, selecting one or more promotional content items to be printed with the print content,
   wherein the one or more promotional settings include a promotional content identifier, a promotional content validation, a customer status level, and a page count.

2. The method of claim 1, further comprising:
   in response to receiving the print request, retrieving the print content from a content source based on the print request.

3. The method of claim 2, further comprising:
   transmitting a print operation instruction to the registered printer to cause the registered printer to print the print content and the one or more promotional content items.

4. The method of claim 2, wherein the content source is a content server in communication with the one or more servers over the one or more networks.

5. The method of claim 1, wherein the one or more servers store the promotional content items in a promotional content server in communication with the one or more servers over the one or more networks, and wherein the one or more promotional content items are scanned and uploaded by the print service provider.

6. The method of claim 1, wherein the one or more promotional content items include at least one of an advertisement, a coupon, a validation code, a barcode, or a link to other promotional content items.

7. The method of claim 1, wherein receiving the print request includes receiving information of a customer status level of the user, and wherein the one or more promotional settings for the registered printer indicates that the one or more promotional content items are to be selected based on the customer status level.

8. A cloud printing server coupled to a network and comprising:
a network interface;
a memory storing instructions for a cloud print service; and
one or more processors, coupled to the network interface and the memory, to execute the instructions, the executed instructions causing the server to:
register a printer with the cloud print service, the registered printer being operated by a print service provider;
receive, from the registered printer over one or more networks, data indicating one or more promotional settings for the registered printer, wherein the print service provider configures the one or more promotional settings on a user interface generated on a display screen of the registered printer, and wherein the one or more promotional settings are usable by the server to define conditions that enable promotional content items that advertise or market a product or service to be printed with the print content when the conditions are satisfied by a print request;
receive, over the one or more networks, a print request from a client device of a user of the cloud print service, the print request identifying (i) the client device, (ii) print content to be printed, and (iii) the registered printer; and
based on the print request and the one or more promotional settings, select one or more promotional content items to be printed with the print content,
wherein the one or more promotional settings include a promotional content identifier, a promotional content validation, a customer status level, and a page count.

9. The server of claim 8, wherein the executed instructions further cause the server to:
in response to receiving the print request, retrieve the print content from a content source based on the print request.

10. The server of claim 9, wherein the executed instructions further cause the server to:
transmit a print operation instruction to the registered printer to cause the registered printer to print the print content and the one or more promotional content items.

11. The server of claim 8, wherein the executed instructions further cause the server to:
store the one or more promotional content items in a promotional content server, wherein the one or more promotional content items are scanned and uploaded by the print service provider.

12. The server of claim 8, wherein the one or more promotional settings for the registered printer indicate that the one or more promotional content items are to be selected based on a page count of the print request.

13. The server of claim 8, wherein the executed instructions further cause the server to omit the one or more promotional content items if the print request specifies that no promotional content items are to be printed.

14. A non-transitory computer-readable medium storing instructions that, when executed by a processor of a server, cause the server to:
register a printer with a cloud print service, the registered printer being operated by a print service provider;
receive, from the registered printer over one or more networks, one or more promotional settings for the registered printer, wherein the print service provider configures the one or more promotional settings on a user interface generated on a display screen of the registered printer and wherein the one or more promotional settings are usable by the cloud print service to define conditions that enable promotional content items that advertise or market a product or service to be printed with the print content when the conditions are satisfied by a print request;
receive a print request from a client device of a user of the cloud print service, the print request identifying (i) the client device, (ii) print content to be printed, and (iii) the registered printer; and
based on the print request and the one or more promotional settings, select one or more promotional content items to be printed with the print content,
wherein the one or more promotional settings includes a promotional content identifier, a promotional content validation, a customer status level, and a page count.

15. The non-transitory computer-readable medium of claim 14, wherein the executed instructions further cause the server to:
in response to receiving the print request, retrieve the print content from a content source based on the print request.

16. The non-transitory computer-readable medium of claim 15, wherein the executed instructions further cause the server to:
transmit a print operation instruction to the registered printer to cause the registered printer to print the print content and the one or more promotional content items.

17. The non-transitory computer-readable medium of claim 14, wherein executed instructions further cause the server to:
store the one or more promotional content items in a promotional content server, wherein the one or more promotional content items are scanned and uploaded by the print service provider.

18. The non-transitory computer-readable medium of claim 14, wherein the executed instructions further cause the server to:
receive information of a customer status level of the user, wherein the one or more promotional settings for the registered printer indicates that the one or more promotional content items are to be selected based on the customer status level.

* * * * *